No. 773,887. PATENTED NOV. 1, 1904.
P. O'NEIL.
APPARATUS FOR TAKING SOUNDINGS.
APPLICATION FILED MAR. 18, 1904.
NO MODEL. 2 SHEETS—SHEET 2.
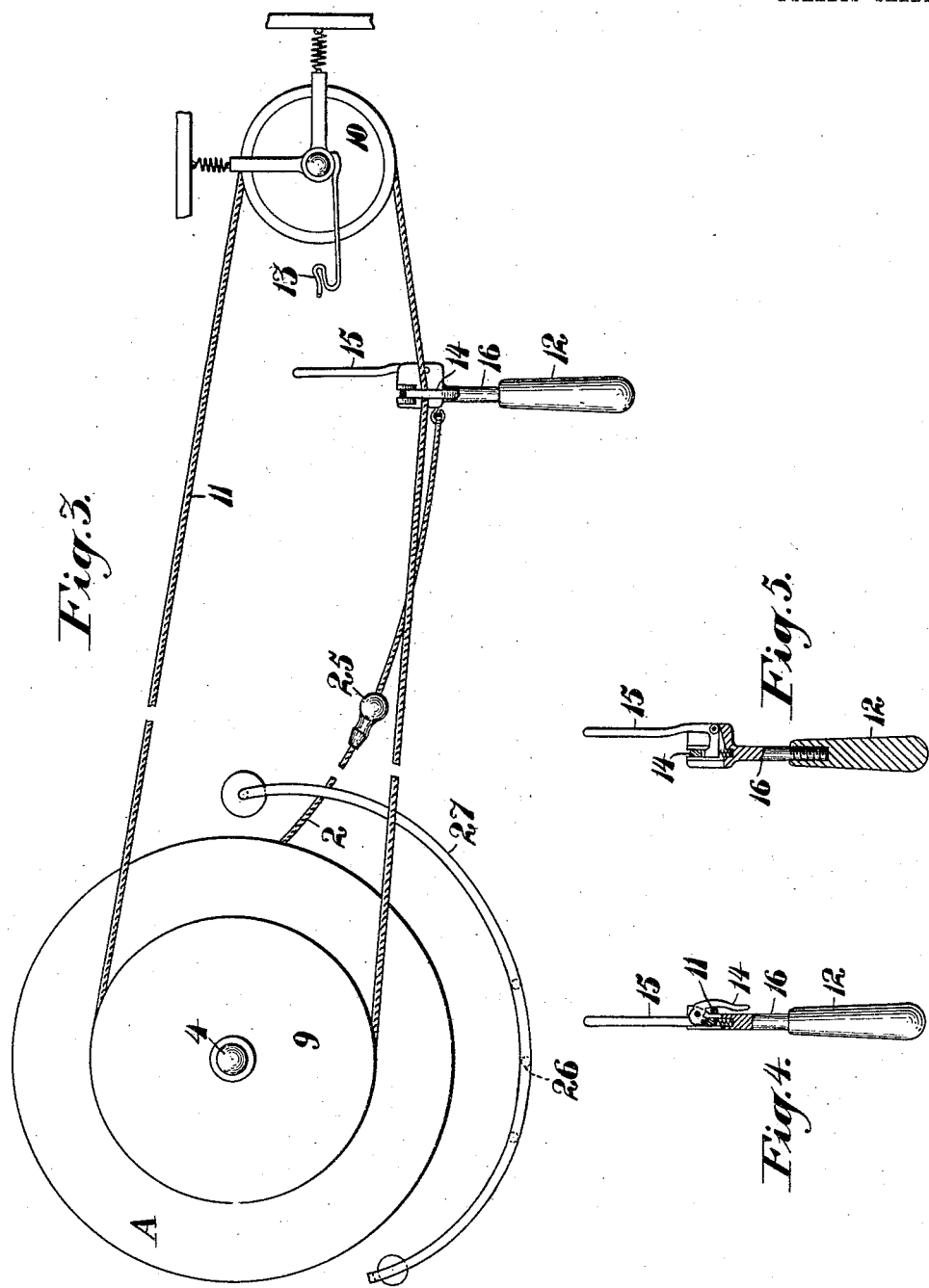
Witnesses:-
F. C. Fliedner
R. L. House
Inventor,
Patrick O'Neil
By Geo. H. Strong.
Atty.

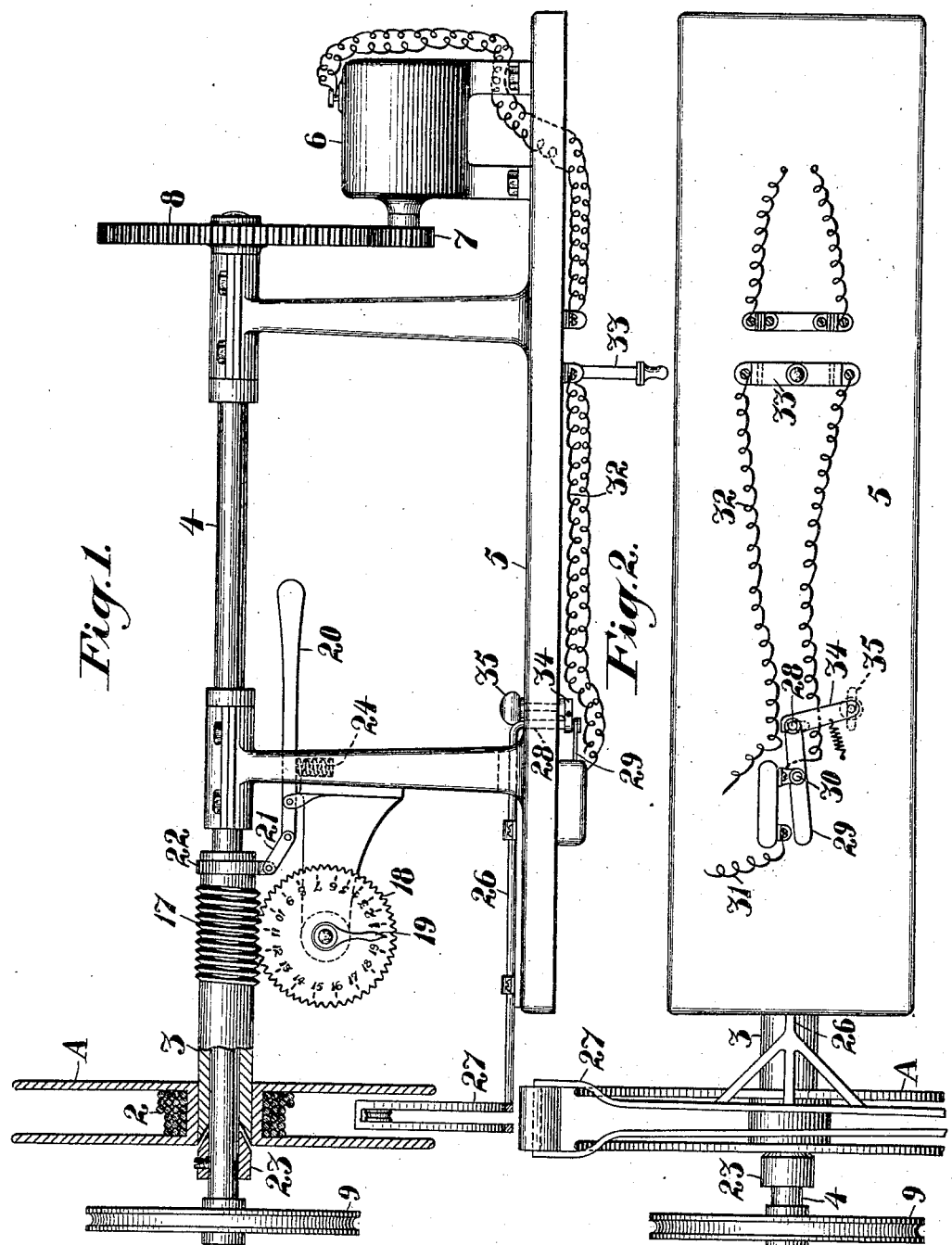

No. 773,887. Patented November 1, 1904.

UNITED STATES PATENT OFFICE.

PATRICK O'NEIL, OF SAN FRANCISCO, CALIFORNIA, ASSIGNOR OF FORTY-FIVE ONE-HUNDREDTHS TO W. L. OWEN, OF SAN FRANCISCO, CALIFORNIA.

APPARATUS FOR TAKING SOUNDINGS.

SPECIFICATION forming part of Letters Patent No. 773,887, dated November 1, 1904.

Application filed March 18, 1904. Serial No. 198,852. (No model.)

*To all whom it may concern:*

Be it known that I, PATRICK O'NEIL, a citizen of the United States, residing in the city and county of San Francisco and State of California, have invented new and useful Improvements in Apparatus for Taking Soundings, of which the following is a specification.

My invention relates to improvements in machines for ascertaining the depth of water, particularly in harbors, rivers, and along shores.

Its object is to provide an apparatus whereby surroundings may be rapidly and accurately taken under weather conditions of any sort, which may be operated by one man from the bridge of the vessel, and which will automatically record the depth fathomed.

It consists of the parts and the construction and combination of parts, as hereinafter more fully described, having reference to the accompanying drawings, in which—

Figure 1 is an elevation of the operating parts of my device with reel in section. Fig. 2 is a view from beneath of same, showing circuits. Fig. 3 is an elevation of the lead-launching mechanism. Figs. 4 and 5 are details of the lead-grip.

In carrying out my invention I employ a reel A, carrying a suitable length of sounding-line 2, mounted on a sleeve 3, which is turnable loose on a shaft 4, but which by suitable clutch mechanism is made to revolve at will with the shaft. The latter is mounted in suitable bearings upon a support, as 5, which may be disposed on or adjacent to the vessel's bridge in such manner that the reel may extend a few feet over the side of the vessel and allow the line when run out to clear the vessel.

Any suitable means may be employed to rotate shaft 4 rapidly—as, for example, the motor 6, whose shaft carries a pinion 7, engaging a gear 8 on shaft 4.

The outer end of shaft 4 carries a fast pulley 9, and the latter and the reel lie in planes essentially parallel with the length of the ship.

Forward of on a relatively lower plane and at a suitable distance from pulley 9 and overhanging the ship's side is a second pulley 10. A line 11 passes around these two pulleys and is adapted to carry the sounding-lead 12 and drop it far enough in advance of the reel and its associated recording mechanism to give the lead time to strike the bottom by the time the ship has moved forward to bring the reel over the spot where the sounding is to be made.

The sounding-lead is provided with a suitable clutch mechanism for gripping the line 11, whereby it will be carried forward, and a convenient trip 13 is arranged in the path of the clutch to release the latter and allow the lead to fall clear. As here shown, the clutch comprises a clamp member 14 and a spring-pressed dog or tripping-arm 15, both pivoted in the head 16, which screws into the lead. The parts 14 15 are disposed with their pivots at right angles to each other, and when the former is pressed down against the side of the head 16 to grip the rope the ratchet-teeth of the member 14 engage a corresponding part of the arm 15 to hold the clamp shut. An oscillation of arm 15 to disengage the clamp member allows the latter to swing up, release the line, and let the lead and sounding-line drop into the water.

The sleeve 3, which, as before stated, is rotatable independently of shaft 4, carries a worm 17, engaging the toothed periphery of the dial 18. The latter is graduated according to the usual sounding measurements, as in fathoms, and is rotatable relative to a fixed pointer 19. The graduations are arranged coördinately with the several operating parts, so that as one fathom of line is wound off the reel one fathom will be recorded on the dial.

To wind up the reel, any suitable clutch mechanism may be employed to lock the sleeve and reel temporarily to the operating-shaft 4, so that the parts turn in unison. As here shown, I employ a lever 20, carrying the links 21, which engage a collar 22 on sleeve 3 to carry the latter into or out of engagement with a friction-clutch 23 on shaft 4. A spring 24 tends to throw the clutch normally out of action and leave the reel and sleeve free to turn on the shaft 4.

In operation with the sounding-line wound on the reel the lead is engaged by the clamp-arm 14 with the inclined carrier-line 11. The shaft 4 is then set in motion, and the lead is quickly carried forward toward the bow of the vessel until the arm 15 engages the stop 13, releasing the lead, which plunges to the bottom. The sounding-line pays out rapidly, the operator watching the reading on the dial. By experience and practice he is able to tell by the tension on the sounding-line when the lead has struck bottom and takes his reading accordingly. To wind up the line, he simply operates lever 20 to throw in the clutch.

To prevent the lead overwinding on the reel, I employ a stop 25 on the line adjacent to the lead end, which operates a cut-out mechanism to stop shaft 4.

Inasmuch as I choose to operate the shaft by electricity, I employ the following means for stopping the motor automatically: 26 is a rock-shaft, mounted on the base 5 and having the segmental convergent guides 27 in the plane of the reel and between which guides the sounding-line passes. The opposite end of shaft 26 carries an arm 28, which engages the switch-point 29. The latter is pivoted intermediate of its ends, as at 30, and is disposed in the motor-circuit in such manner as when closed to allow current to pass from the feed-wire to the motor and when open to cut out the motor. As shown diagrammatically in Fig. 2, 31 32 represent the feed-wires. The wire 31 connects with one blade of the knife-switch 33, and the other wire, 32, in which is interposed switch 29, connects with the other blade of switch 33. With both switches closed the motor may run. With either of them open the motor is inert. Normally the unbalanced weight of guides 27 will rock shaft 26, so as to close the switch 29 and allow the motor to run when switch 33 is closed. Any uplift on the guides to rock the shaft in the opposite direction will open switch 29 and cut out the current. The switch 29 is held open by means of a notched spring-pressed arm 34 engaging the arm 28 of shaft 26. To release arm 28 and close switch 29 after pressure on the guides 27 is removed, it is only necessary for the operator to turn the button 35, which is rigid with arm 34. The stop 25 on the lead-line has a smaller conical head at the top, which first engages the guides directly beneath the reel and in such manner that a continued pull on the line will lift up on the forward end of the guides and rock the shaft and shut off the current to and stop the motor. As the guides separate gradually toward their forward end the smaller upper end will be allowed to pass through the guides and then when clutch-lever 20 is released will fall to a point just beneath the reel and be supported on the guides, the guides thus acting as a grab to hold the lead after the sounding-line has been wound up and the motor stopped. Thus one man standing on the bridge of the vessel may launch the lead, read the result of the trial, coil up his line, and launch his lead again as many times as needs be and do it quicker and with more accuracy than by the old method, where three or four men are necessary to handle the line and to report the result back by word of mouth to the captain.

Having thus described my invention, what I claim, and desire to secure by Letters Patent, is—

1. In a sounding apparatus, the combination of a reel or drum, a sounding-line thereon, a lead, means for automatically launching the lead forward of the reel, means for indicating the amount of line paid out, means for winding up said line and means for automatically discontinuing the operation of said winding means on the recovery of the lead.

2. In a sounding apparatus, the combination of an operating-shaft, means for driving the same, a reel or drum freely turnable thereon, a sounding-line on said reel, a lead, means for automatically launching the lead in advance of the reel, mechanism for indicating the amount of line paid out, means for winding up the reel, and means for automatically discontinuing the operation of the winding means on recovery of the lead.

3. In a sounding apparatus, the combination of a drive-shaft, a reel or drum turnable thereon, a sounding-line on said reel, means for operating the drive-shaft and reel in unison and means for automatically discontinuing the operation of said shaft on recovery of the lead.

4. In a sounding apparatus, the combination of a drive-shaft, means for operating the same, a reel or drum loosely turnable on said shaft, a sounding-line on said reel, a lead, indicating mechanism operatable by the reel to indicate the amount of line paid out, means in conjunction with said drive-shaft for winding up the reel, and means for automatically discontinuing the operation of said shaft on the recovery of the lead.

5. In a sounding apparatus, the combination with a drive-shaft and means for operating the same, of a sleeve loosely turnable on said shaft, a reel or drum mounted on said sleeve, a sounding-line on said reel, a lead, a worm carried by said sleeve, a graduated disk and means engaging the worm to rotate the disk and clutch mechanism for operating the sleeve and shaft in unison.

6. In a sounding apparatus, the combination of an endless carrier, a drum or reel associated therewith, a sounding-line on said reel, a lead, grip means carried by the lead to engage said carrier, and means in the path of the lead to release said grip means.

7. In a sounding apparatus, the combination of a reel, a sounding-line thereon, a lead, means for launching said lead at a point in advance of said reel, said means including an endless carrier, gripping means on the lead and trip mechanism for automatically releasing said grip.

8. In a sounding apparatus, the combination of a reel, a sounding-line thereon, a lead and means for launching said lead at a point remote from said reel, said means including an inclined carrier, grippers for engaging said lead with said carrier and means in the path of the grippers for automatically releasing said lead therefrom.

9. In a sounding apparatus, the combination of a reel, a sounding-line thereon, a lead, an endless carrier associated with said reel and grip mechanism carried by the lead to engage said carrier.

10. In a sounding apparatus the combination of a reel, a sounding-line thereon, a lead, an endless carrier associated with said reel and grip means carried by the lead to engage said carrier, said grip means including two interlocking arms 14 15 and means in the path of one of said arms to release the lead.

11. In a sounding apparatus, the combination of a shaft, means for rotating said shaft, a reel freely turnable thereon, a sounding-line on said reel, a lead, mechanism for indicating the amount of line paid out, means for rotating the reel and shaft in unison to wind up the line and means for automatically discontinuing the winding movement of the reel on the recovery of the lead.

In testimony whereof I have hereunto set my hand in presence of two subscribing witnesses.

PATRICK O'NEIL.

Witnesses:
   S. H. NOURSE,
   JESSIE C. BRODIE.